United States Patent
Sykora

[11] 3,791,482
[45] Feb. 12, 1974

[54] NOISE SUPRESSION AIR DUCT ASSEMBLY FOR AIR COOLED INTERNAL COMBUSTION ENGINES IN VEHICLE INSTALLATIONS

[75] Inventor: Hans Werner Sykora, Drummondville, Quebec, Canada

[73] Assignee: The Coleman Company, Inc., Wichita, Kans.

[22] Filed: May 14, 1973

[21] Appl. No.: 360,337

[52] U.S. Cl............ 181/35 R, 181/33 K, 180/54 A, 123/41.7
[51] Int. Cl............................................. F01m 1/00
[58] Field of Search.... 181/33 K, 35 R, 35 A, 36 R, 181/36 B, 36 E, 36 D, 40; 123/41.7; 180/54 A

[56] References Cited
UNITED STATES PATENTS

| | | | |
|---|---|---|---|
| 2,067,758 | 1/1937 | Flogaus | 180/54 A |
| 2,393,899 | 1/1946 | Gregory | 180/54 A UX |
| 3,147,814 | 9/1964 | Suhre | 181/36 D UX |
| 3,530,840 | 9/1970 | Freyn | 181/33 K X |
| 3,618,691 | 11/1971 | Honda | 180/54 A |
| 3,642,092 | 2/1972 | Cederbaum | 181/33 K |
| 2,693,602 | 9/1972 | Thien et al | 181/33 X |

FOREIGN PATENTS OR APPLICATIONS

| | | | |
|---|---|---|---|
| 887,262 | 8/1943 | France | 180/54 A |

Primary Examiner—Richard B. Wilkinson
Assistant Examiner—John F. Gonzales

[57] ABSTRACT

The noise emitted by an air cooled internal combustion engine in a vehicle installation is suppressed by an air duct assembly which is light weight and easily removable to permit access to the engine and related components for routine adjustments and servicing. The duct assembly includes relatively rigid air intake and air exhaust ducts, each of which is integrally molded from plastic with sound absorbing qualities. For axial fan cooled engines, the fan and cylinder cooling fins are enclosed by a shroud provided with air intake and exhaust openings. The cowl of the vehicle which encloses the engine is also provided with air intake and exhaust openings. The intake duct extends between the air intake opening of the vehicle cowl and the air intake opening in the engine shroud, and the exhaust duct extends between the exhaust opening of the engine shroud and the exhaust opening in the vehicle cowl. Each duct provides a baffled or tortuous air passage so that noise cannot escape through the duct without being reflected from the walls of the duct, and each duct is removably secured to either the engine shroud or the cowl by spring latches which permit quick removal of the ducts when desired. The duct assembly also supplies combustion air through a baffled path to a carburetor plenum chamber.

12 Claims, 14 Drawing Figures

NOISE SUPRESSION AIR DUCT ASSEMBLY FOR AIR COOLED INTERNAL COMBUSTION ENGINES IN VEHICLE INSTALLATIONS

BACKGROUND

This invention relates to a duct assembly for suppressing noise in vehicle installed air-cooled combustion engines, and, more particularly, to a noise suppression duct assembly for snowmobiles.

Internal combustion engines for snowmobiles and similar vehicles are generally air cooled, and it is necessary to assure a supply of cooling air to the engine cooling fan to provide efficient cooling. The carburetor must also be supplied with air to be drawn into the cylinder of the engine with the fuel.

It has been found that engine noise will escape through the openings in the vehicle provided for the cooling air and the combustion air, and this noise may affect the acceptability of the vehicle. Noise reduction for vehicle engines has become of particular interest in recent years in view of the activity of various noise pollution control agencies.

Some attempts at reducing engine noise have included enclosing the engine within an outer casing and directing cooling air into the enclosure through a baffled or tortuous path. However, the total enclosure and the baffled intake and exhaust paths for the cooling air heretofore have been relatively cumbersome structures which seriously interfere with the ability to adjust and service the engine and related components. The engine enclosure may also allow a short circuiting of cooling air within the enclosure permitting hot exhaust air to be drawn into the engine cooling fan and carburetor air intakes. This will result in carburetor vapor lock, and ultimately in engine overheating.

SUMMARY OF THE INVENTION

The invention provides a duct assembly for an internal combustion engine which includes an intake duct, an exhaust duct, and duct means for supplying cool combustion air to the carburetor. The intake and exhaust ducts are molded from relatively rigid plastic into light weight self-supporting structures, and the ducts are held in place by spring latches which permit the ducts to be quickly and easily removed when access to engine components is desired. The ducts communicate directly with the outside of the vehicle so that cool outside air is supplied to the engine and heated air is exhausted to provide maximum cooling and to avoid excessive heat build-up. Noise transmission to the outside of the vehicle through the ducts is reduced by internal baffling in the ducts which provide sound absorption and avoid direct paths of sound transmission from the engine to the outside of the vehicle. Flexible sealing means are provided between the ducts and the vehicle cowl to substantially prevent noise leakage therebetween and to reduce the transmission of engine vibrations from the ducts to the cowl. The duct assembly also provides a plenum chamber enclosing the carburetor which effectively isolates the carburetor from the engine and the engine compartment and supplies the carburetor with cold intake air. The carburetor is entirely surrounded by cool air reducing the possibilities for vapor lock. The plenum is of sufficient volume (several times greater than piston displacement) to minimize pressure pulses during air intake which would lower engine performance. The ducting which provides the carburetor plenum also permits ready access to the carburetor for adjustment or service. The passage for supplying air to the plenum chamber is baffled to reduce noise transmission from the engine through the carburetor and to reduce the likelihood that snow and other impurities will reach the carburetor and cause carburetor icing or reduce engine life.

DESCRIPTION OF THE DRAWING

The invention will be explained in conjunction with illustrative embodiments shown in the accompanying drawing, in which.

DESCRIPTION OF SPECIFIC EMBODIMENTS

Figure 1:
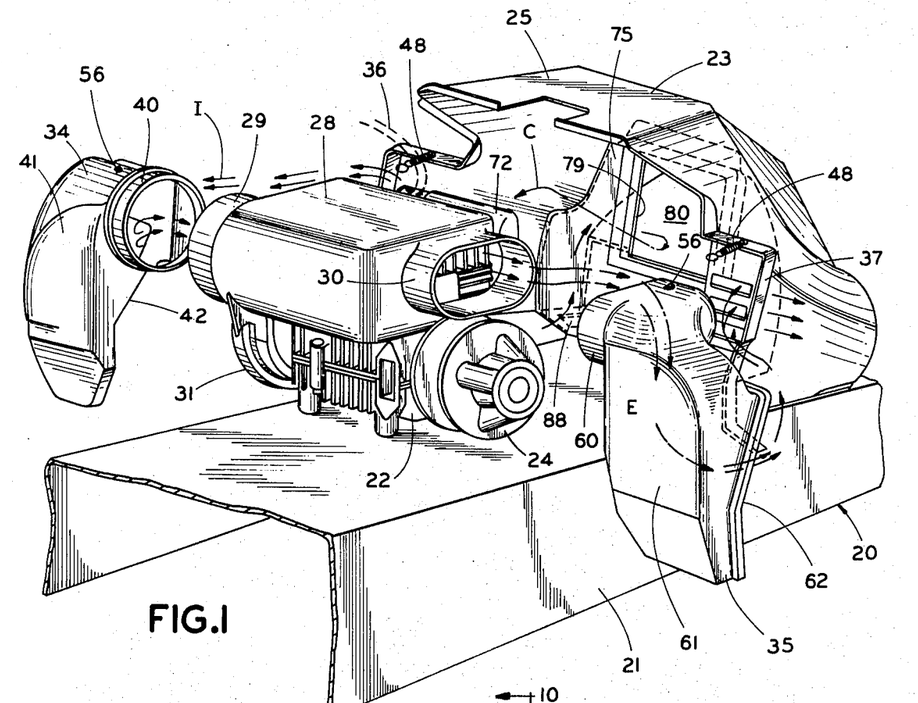
FIG. 1 is an exploded fragmentary perspective view of a snowmobile equipped with one embodiment of the inventive duct assembly.
Figure 2:
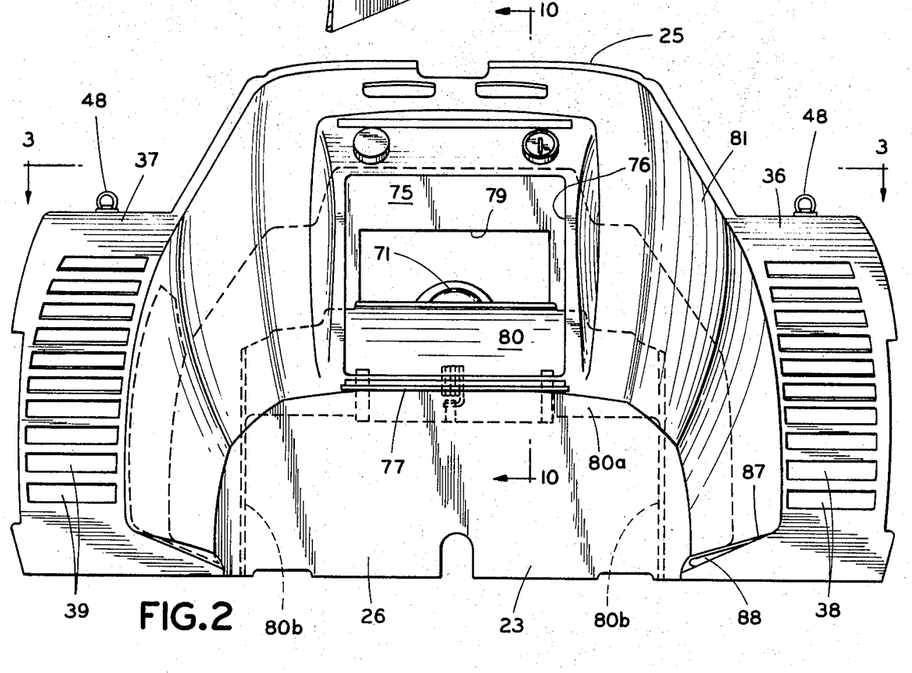
FIG. 2 is a view of the rear of the snowmobile console shown in FIG. 1 with the console, engine, and duct assembly in their assembled positions.
Figure 3:
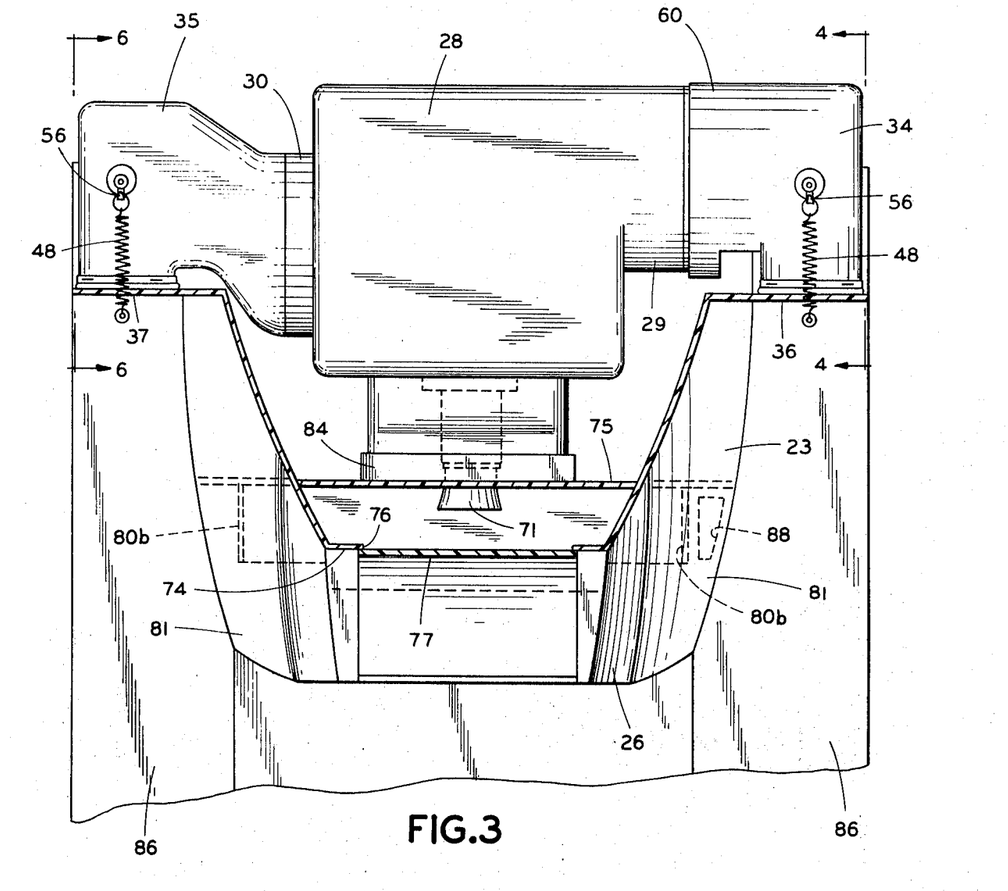
FIG. 3 is a sectional view taken along the lines 3—3 of FIG. 2.

Referring to FIGS. 1-3, the numeral 20 designates generally a snowmobile having a frame which includes a conventional channel-shaped track tunnel 21, an air cooled internal combustion engine 22, and a cowl including a console 23. The engine is mounted on the track tunnel and drives a conventional endless driving track (not shown) mounted within the track tunnel by means of a drive pulley 24 attached to the crankshaft of the engine and a drive belt (not shown). The console may be formed of injection molded plastic and includes a top portion 25 which extends over the top of the engine and a rear portion 26 which is positioned just forwardly of the operator of the snowmobile. The vehicle cowl also includes a conventional hood which is not shown in the first embodiment, which extends from the front end of the vehicle to the console to enclose the engine and provide an engine compartment. The hood may also be formed of injection molded plastic.

A shroud 28 is mounted to the engine and encloses the fan and cylinder cooling fins of the engine to form an air cooling chamber between the shroud and the engine cylinders. The shroud is provided with a generally cylindrical air intake duct 29 which extends toward the right side of the vehicle (as viewed from the driver position) and a generally oval air exhaust duct 30 which extends toward the left side of the vehicle. A conventional air fan is mounted within the air chamber and driven by a drive belt 32 (FIG. 10) and a pulley 31 attached to the engine crankshaft.

The air fan draws cooling air into the air chamber provided by the cover 28 through an air intake duct 34 and through suitable openings in the console (to be explained more fully hereinafter) as indicated by the arrows I in FIG. 1. The cooling air is forced by the cooling fan through the air chamber and over the engine cylinder cooling fins and is exhausted through an air exhaust duct 35 and through openings in the console as indicated by the arrows E.

Figure 4:
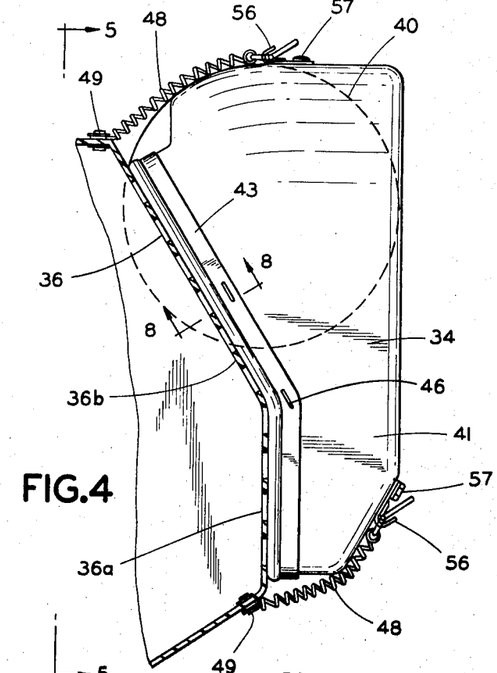
FIG. 4 is a fragmentary sectional view taken along the line 4—4 of FIG. 3 showing the air intake duct.
Figures 6, 7:
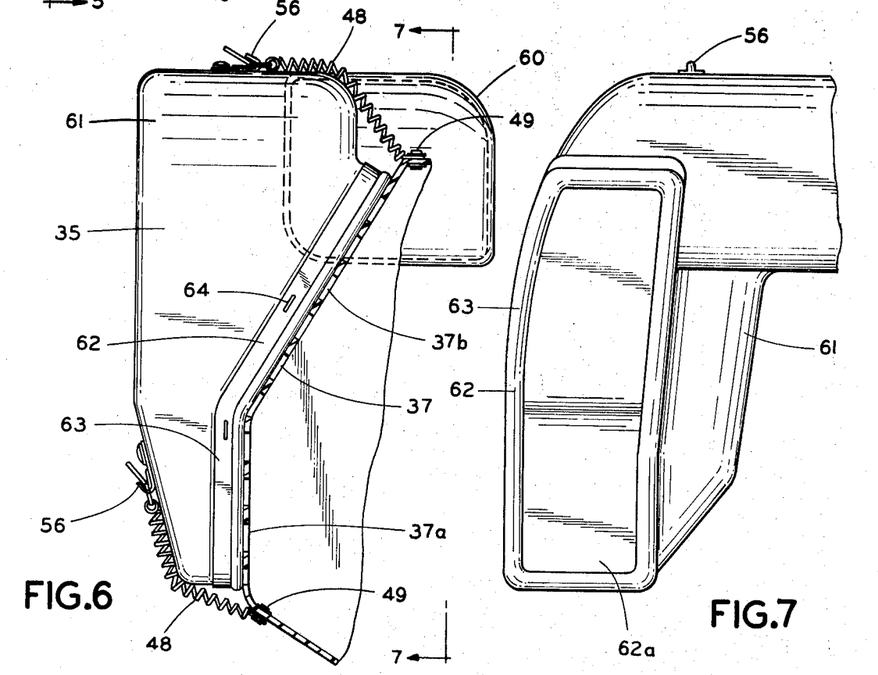
FIG. 6 is a fragmentary sectional view taken along the line 6—6 of FIG. 3 showing the air exhaust duct.
FIG. 7 is a fragmentary view of the exhaust duct as would be seen along the line 7—7 of FIG. 6.

FIG. 2 illustrates the console as viewed from the driver's seat, and the console is seen to include right and left hand laterally outwardly extending panels 36 and 37, respectively, which are provided with a series of vertically spaced horizontally extending openings 38 and 39. As can be seen in FIGS. 4 and 6, each of the laterally extending projections 36 and 37 is somewhat V-shaped, the panel 36 including a generally vertically extending lower portion 36a and an upper portion 36b which is inclined rearwardly, i.e., toward the driver. Similarly, the left panel 37 includes a vertically extending lower portion 37a and a rearwardly inclined upper portion 37b. The hood includes similarly shaped lateral portions, and the rear edge of the hood is adapted to mate with the forward edge of the console to substantially prevent noise leakage from the engine compartment through the juncture between the hood and the console.

Figure 5:
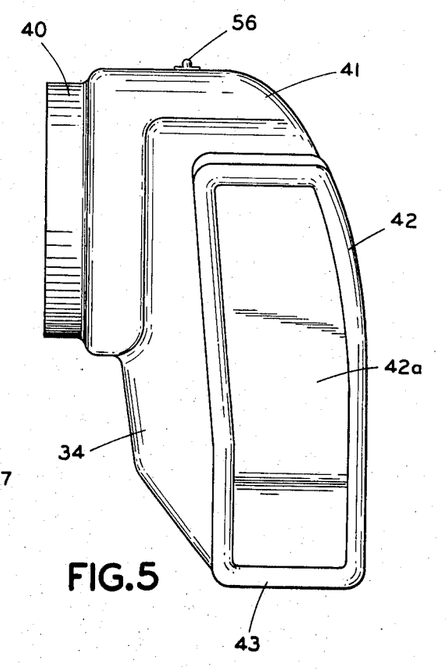
FIG. 5 is a view of the air intake duct and as would be seen along the line 5—5 of FIG. 4.
Figure 8:
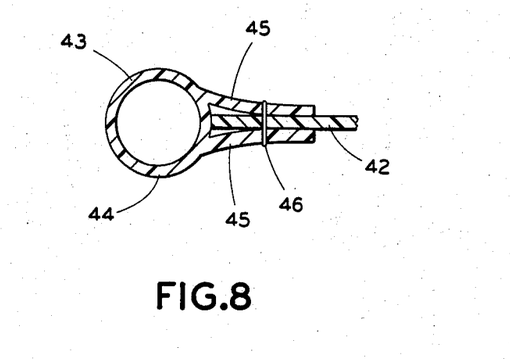
FIG. 8 is a fragmentary sectional view taken along the line 8—8 of FIG. 4 showing the sealing gasket for the intake duct.

Referring now to FIGS. 4 and 5, the air intake duct 34 is integrally molded from plastic having good sound-absorbing properties and includes a circular collar portion 40 adapted to be snugly received by the intake duct 29 of the engine shroud, a main body portion 41, and a console portion 42 which has a generally rectangular opening 42a (FIG. 5) and which is generally V-shaped in side elevation (FIG. 4) to matingly engage the V-shaped console panel 36. A flexible, resilient sealing gasket 43 is secured to the periphery of the console portion 42, and the sealing gasket resiliently engages the console panel 36 to substantially prevent noise leakage between the intake duct and the console panel and to minimize transmission of engine vibration from the intake duct to the console. Referring to FIG. 8, the gasket 43 includes a circular sealing portion 44 which is engageable with the console and a pair of spaced-apart attaching legs 45 which straddle the wall of the console portion 42 of the intake duct and which are secured thereto by staples 46 at spaced-apart locations along the periphery of the duct.

Figure 13:
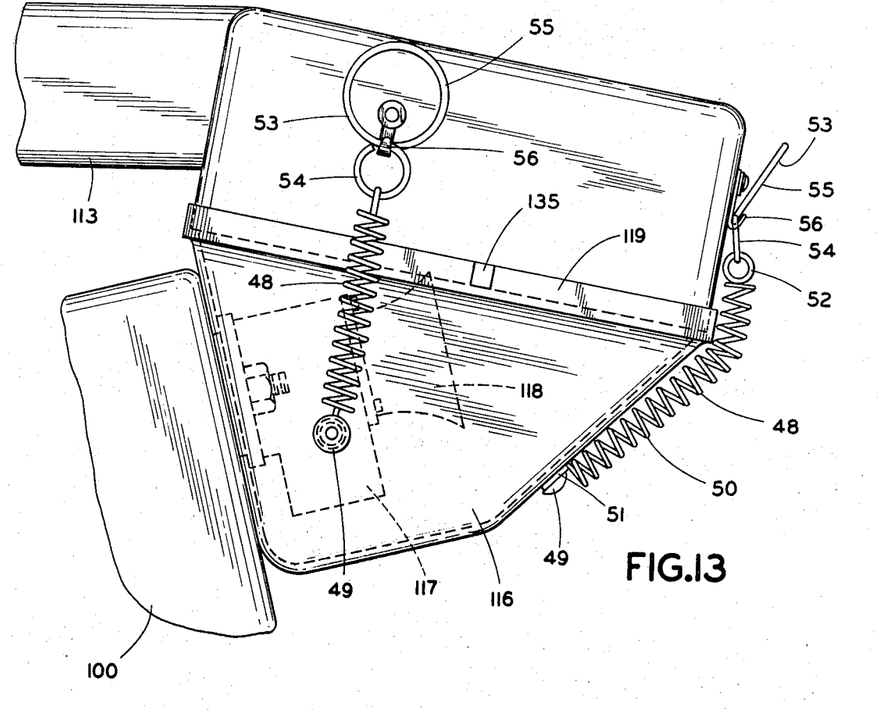
FIG. 13 is an enlarged fragmentary elevational view of the carburetor plenum of FIGS. 11 and 12 formed by the intake duct and the carburetor box.
Figure 14:
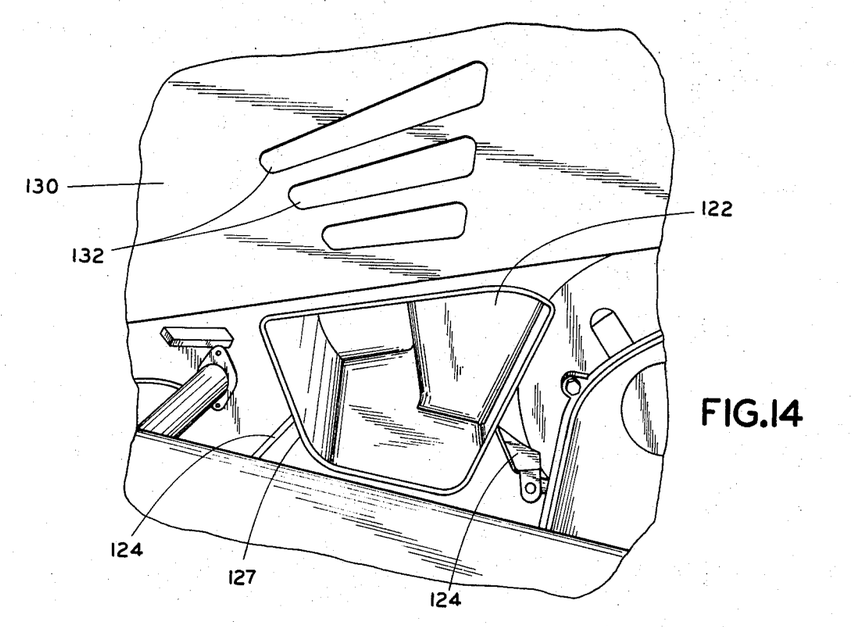
FIG. 14 is a fragmentary side elevational view of the snowmobile with the hood partially raised to expose the exhaust duct.

The air intake duct 34 is securely held in position by a pair of spring latches 48 which are secured to the top and bottom of the console panel 36 by rivets 49. Referring to FIG. 13, each spring latch 48 includes an elongated coil spring 50 having a first looped end 51 which is secured by a rivet 49 and a second looped end 52 which is secured to an attaching ring 53. The attaching ring is formed from a single piece of wire which is shaped in the form of a figure 8 to provide a small attaching ring portion 54 and a large handle ring portion 55. The planes of the ring portions 54 and 55 are inclined relative to each other so that the handle ring extends outwardly to facilitate grasping the ring. A pair of hooks 56 are secured to the air intake duct by rivets 57, and each spring latch is attached to the associated hook by grasping the handle ring 55 and pulling the spring toward the hook until the attaching ring 54 can be engaged with the hook.

The air intake duct is positioned by inserting the circular collar portion 40 thereof into the circular intake duct 29 of the engine shroud while the rectangular console portion 42 is being positioned against the console panel 36. The size of the intake duct is such that the sealing gasket 43 on the duct will engage and be compressed by the console panel when the collar 40 is inserted into the intake duct 29 of the engine shroud. When the intake duct is properly positioned, it can be secured in place by means of the two spring latches. The rectangular periphery of the console portion 42 of the intake duct surrounds the slotted portion of the console panel 36, and intake air is drawn by the air cooling fan inwardly through the slots 38, through the intake duct and into the air cooling chamber.

Referring to FIGS. 6 and 7, the exhaust duct 35 is seen to be somewhat similarly shaped so that it matingly engages the V-shaped console panel 37. The exhaust duct includes a generally oval intake collar portion 60, a main body portion 61, and a console portion 62 having a generally rectangular opening 62a (FIG. 7). A sealing gasket 63 similar to sealing gasket 43 is secured to the periphery of the console portion by staples 64, and the console portion is seen to be generally V-shaped in side elevation (FIG. 6) to conform to the contour of the V-shaped console panel 37. The oval intake collar 60 is sized to fit snugly over the oval exhaust collar 30 of the engine shroud, and the exhaust duct is sized so that the sealing gasket resiliently bears against the console panel 37 when the collar 60 is positioned over the duct 30. A pair of spring latches 48 attached to the top and bottom of the console panel are engageable with hooks 56 on the exhaust duct to hold the exhaust duct in position. The air cooling fan forces the cooling air through the exhaust opening of the engine shroud provided by the duct 30, through the exhaust duct 35, and outwardly through the slots 39 in the console panel 37.

Cooling air for the engine is thus supplied directly from outside of the engine compartment to insure efficient cooling, and the heated air which exits from the cooling chamber is exhausted to the outside of the engine compartment to minimize heat build-up within this compartment. The air is forced to follow a tortuous path through the intake duct between the intake openings in the console and the intake opening of the engine shroud and through the exhaust duct between the exhaust opening of the engine shroud and the exhaust openings in the console to provide a baffled effect which reduces noise emission from the engine. The ducts are formed of sound-absorbing material to absorb some of the sound which impinges upon the inner surfaces of the ducts. The particular ducts illustrated are rotationally molded from high density polyethylene.

Each of the ducts is securely held in place by a pair of spring latches, and each duct can be easily removed by disengaging the spring latches from the securing hooks to provide access to various parts of the engine and related components. For example, in the snowmobile illustrated, the engine starter rewind, magneto, timing mechanism, cooling fan, and fan belt are located on the right side of the engine, and removal of the intake duct provides access to these components. Removal of the exhaust duct provides access for changing the drive belt or inspecting the clutch pulley which drives the belt.

Figure 9:
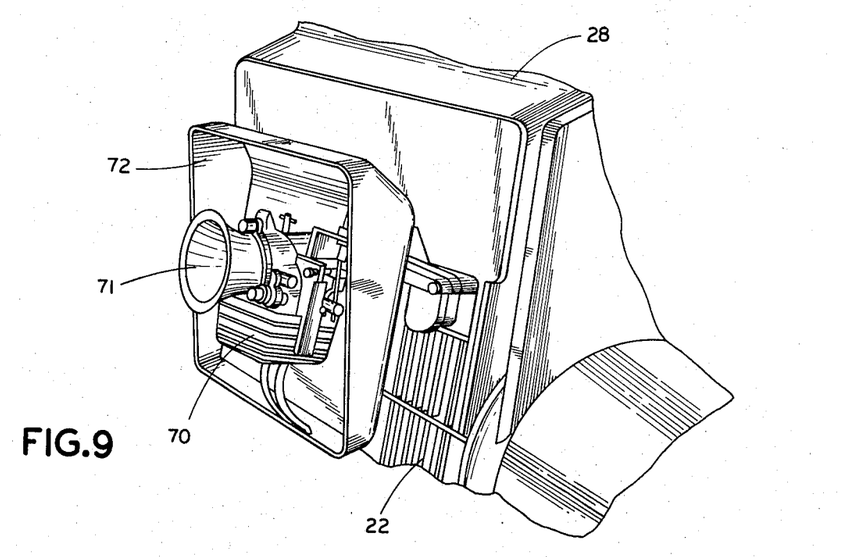
FIG. 9 is a fragmentary perspective view of the rear portion of the engine showing the carburetor and carburetor box.
Figure 10:
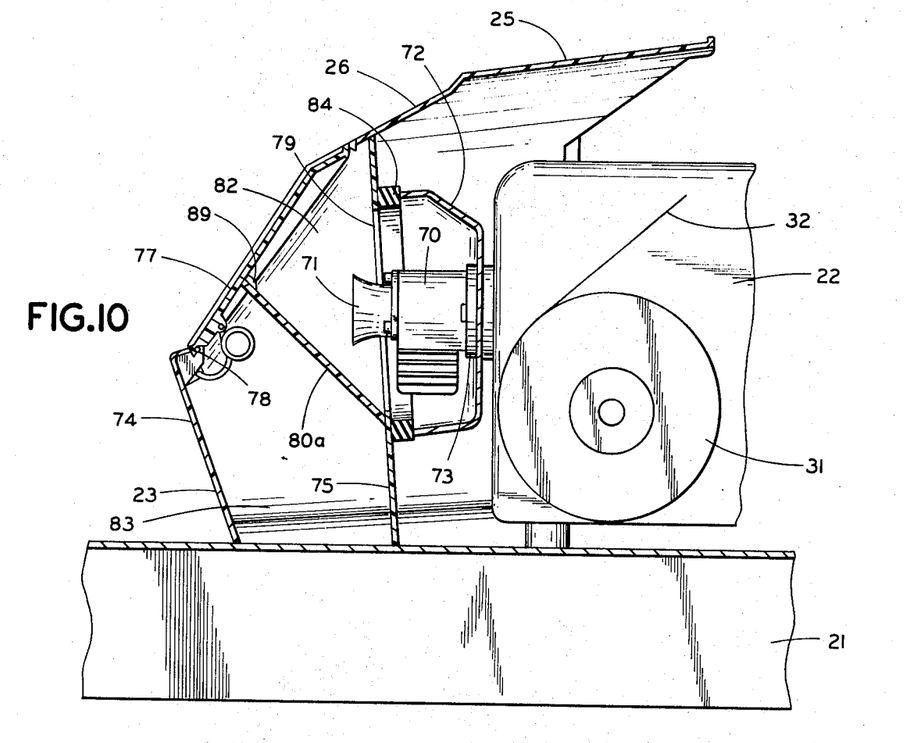
FIG. 10 is a fragmentary sectional view taken along the line 10—10 of FIG. 2 with the console door closed.

Ducting is also provided for supplying intake air to the carburetor. Referring to FIGS. 9 and 10, a conventional carburetor 70 is mounted on the engine 22 with the air intake 71 thereof extending rearwardly or toward the driver's seat. A carburetor box 72, which may be formed of the same sound-absorbing material as the intake and exhaust ducts is secured between the engine and the mounting flange 73 of the carburetor and extends around the carburetor. The rear portion 26 of the console includes a rear wall 74 and an intermediate wall or partition 75 which is spaced forwardly of the rear wall 74. The rear wall 74 is provided with an access opening 76 (FIG. 2) which is closed by a door 77 hingedly secured to the rear wall at 78. The door is shown in its open position in FIG. 2 and in its closed position in FIGS. 3 and 10.

The intermediate wall 75 is provided with a central opening 79 through which the air intake 71 of the carburetor extends, and a generally U-shaped partition 80 extends between the partition 75 and the rear wall 74. The U-shaped partition includes an inclined top portion 80a which extends upwardly and rearwardly from the partition 75 below the opening 79 therein to the middle portion of the door 77 and a pair of downwardly extending sides 80b which are spaced inwardly from the side walls 81 of the console. The top wall 80a of the partition 80 cooperates with the upper portion of the door 77, the partition 75 and the carburetor box 72 to form a carburetor plenum chamber 82, and a storage compartment 83 is provided below the top wall 80a between the side walls 80b. A rectangular compressible and resilient sealing gasket 84 is mounted on the forward surface of the partition 75 and surrounds the opening 79 therein. The resilient sealing gasket 84 has a shape corresponding to the periphery of the carburetor box and engages the carburetor box to reduce warm air leakage between the carburetor box and the partition 75 from the engine compartment to the carburetor plenum chamber 82 and to reduce transmission of engine vibration to the console.

The bottom of the right side wall 81 of the console extends inwardly adjacent the right panel 36 above the right footrest 86 (FIG. 8) to provide a bottom panel 87 (FIG. 2), and an intake opening 88 is provided through the bottom wall (see also FIG. 1). Intake air for the carburetor flows inwardly through the opening 88, upwardly within the space between the right side wall 80b of the partition 80 and the right side wall 81 of the console, and into the plenum chamber above the top wall 80a of the partition as indicated by the arrows C in FIG. 1. The tortuous path followed by the intake air baffles engine noises emitted from the carburetor, and the carburetor plenum chamber provides a volume of intake air which is many times greater than the volume of one piston displacement. The plenum chamber therefore reduces air flow pulses to the carburetor, and as the carburetor draws off air from the plenum chamber, cool air from outside of the vehicle steadily flows into the plenum chamber to replace the air withdrawn. The carburetor plenum chamber isolates the carburetor from the engine and the engine compartment and keeps the carburetor surrounded by cold intake air. Placing the carburetor within the plenum chamber therefore not only reduces noise emission but reduces the temperature of the carburetor and the likelihood of vapor lock.

The intake opening 85 for the carburetor intake air is located above the footrest (compare FIGS. 2 and 3), and this positioning of the intake opening and the tortuous path which the intake air is required to follow to the plenum chamber reduces the likelihood that snow will reach the carburetor and cause carburetor icing. The position of the opening and the tortuous intake air path also reduces the likelihood that impurities will reach the engine through the carburetor and thereby increases engine life.

Access to the carburetor is provided by opening the door 77, and this also provides access to the storage compartment 83 (see FIG. 10). A spoiler or lip 89 extends forwardly from the door 77 and over the rear edge of the partition 80 when the door is closed to prevent carburetor spit-back from running into the storage compartment.

In the particular embodiment illustrated, the console was formed from injection molded polycarbonate, and the partitions 75 and 80 were formed from thermoformed polycarbonate sheet and were permanently attached to the console.

Figures 11, 12:
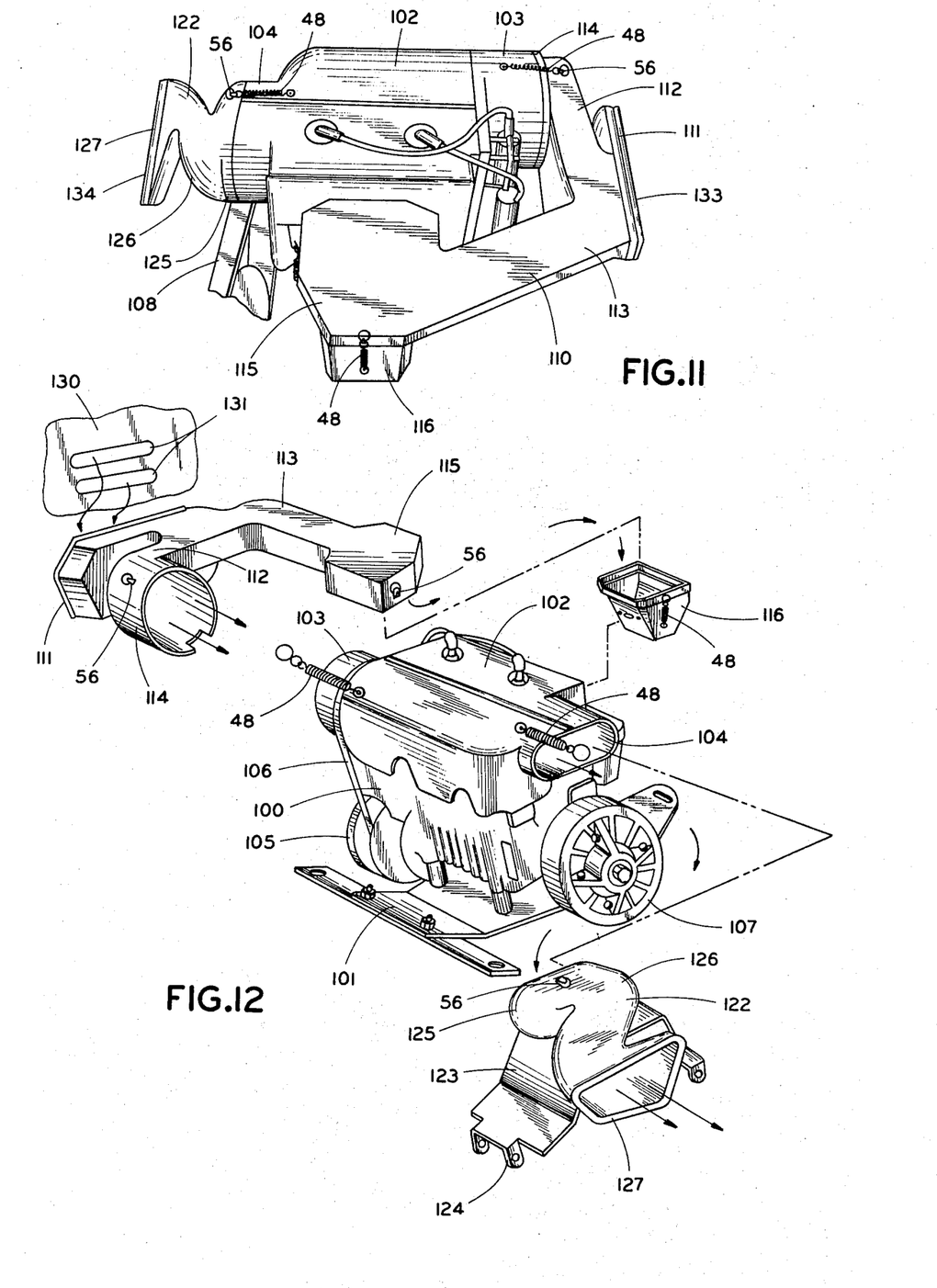
FIG. 11 is a fragmentary perspective view of a snowmobile engine equipped with another embodiment of the duct assembly.
FIG. 12 is an exploded perspective view of the structure of FIG. 11 from another angle.

A modified ducting assembly is illustrated in FIGS. 11-14. An engine 100 is mounted on a mounting base 101 which is in turn mounted on the frame of a vehicle such as a snowmobile. An engine shroud 102 is mounted on the engine and provides an air cooling chamber having a circular intake duct 103 and an oval exhaust duct 104. An air fan within the air cooling chamber is driven by a pulley 105 mounted on the crankshaft of the engine and a drive belt 106, and the engine drives the vehicle by means of a drive pulley 107 mounted on the other end of the crankshaft and a drive belt 108 (FIG. 11).

A somewhat Y-shaped rotationally molded air intake duct 110 includes a generally oval intake portion 111, and a pair of branches 112 and 113 which extend angularly from the intake portion 111. The branch 112 terminates in a cylindrical collar 114 which is sized to be snugly received by the intake duct 103 of the engine shroud, and the branch 113 terminates in a box-like cover 115 which is sized to fit snugly over carburetor box 116. As can be seen in FIG. 13, carburetor box 116 is mounted between the engine 100 and carburetor 117 and surrounds the carburetor and the air intake 118 thereof. The periphery of the carburetor box is provided with an L-shaped perimetric flange 119 which snugly receives and supports the periphery of the cover portion 115 of the intake duct, and the intake duct is removably secured to the carburetor box by a pair of spring latches 48 which are secured to the carburetor box and which are engageable with hooks 56 on the intake duct as described herein before. The collar portion 114 of the intake duct is similarly secured to the engine shroud by a spring latch 48 attached to the engine shroud which engages a hook 56 on the collar. The flange 119 of the carburetor box and the lower edge of the cover portion 115 of the intake duct may be provided with slots 120 through which the throttle and choke cables (not shown) for the carburetor can pass.

A somewhat S-shaped exhaust duct 122 is mounted on a pulley guard 123 which has an inverted U-shape and which is shaped to fit over the drive pulley 107. The pulley guard is adapted for pivotal attachment to the vehicle frame by means of a bifurcated hinge bracket 124 which receives a hinge pin. The exhaust duct includes a generally oval intake portion 125 which is sized to fit snugly over the exhaust duct 104 of the engine shroud, an S-shaped body portion 126, and an exhaust portion 127 having a somewhat trapezoidal shaped opening. The exhaust duct is removably secured to the engine shroud by means of a spring latch 48 secured to the engine shroud adjacent the exhaust duct 104 thereof and a hook 56 secured to the exhaust duct.

The ducting assembly illustrated in FIGS. 11-14 is designed for use with a snowmobile engine which is mounted on the snowmobile frame forwardly of the track tunnel. The snowmobile includes a conventional hood 130 (shown partially in FIGS. 12 and 14), and the hood can be hingedly secured to the front of the frame to permit the hood to be raised to provide access to the engine.

The right side of the hood is provided with intake openings 131 which are shaped to fall within the contour of the intake portion 111 of the intake duct when the hood is closed, and the left side of the hood is provided with exhaust openings 132 which are shaped to fall within the contour of the exhaust portion 127 of the exhaust duct. The intake and exhaust ducts are provided with flexible, resilient sealing gaskets 133 and 134, respectively, around the periphery of their respective openings similar to the sealing gaskets 43 and 63 hereinbefore discussed. The sealing gaskets surround the intake and exhaust openings in the hood and engage the hood to reduce noise leakage between the ducts and the hood and to reduce the transmission of engine vibration from the ducts to the hood.

The cooling air fan draws cooling air from outside of the engine compartment through the intake openings 131 in the hood, through the intake portion of the intake duct, through the branch 112 and the collar portion 114 and into the engine air cooling chamber. Heated cooling air is forced through the exhaust opening 104 of the engine shroud, through the exhaust duct 122, and out of the engine compartment through the exhaust openings 132 in the hood. Both the intake duct and exhaust duct provide a tortuous path for the cooling air to prevent direct transmission of noise from the engine to outside of the vehicle, and the ducts are advantageously rotationally molded from sound-absorbing material such as high density polyethylene.

The air intake duct also provides intake air for the carburetor. A portion of the air which flows through the intake openings 131 in the hood flows through the branch 113 of the intake duct and into the carburetor plenum chamber formed by the cover portion 115 and the carburetor box 116. The volume of the plenum chamber is many times the volume of a single piston displacement, and the carburetor is therefore always surrounded by a large quantity of cool intake air which minimizes pulsing and reduces the likelihood of vapor lock. The intake openings are provided through the hood well above the snow over which the snowmobile is traveling, and this positioning of the intake openings as well as the baffled path for the carburetor intake air reduces the likelihood that snow or other impurities will reach the carburetor.

When desired, both the intake duct and the exhaust duct can be quickly removed to provide access to the engine and the related components. The intake duct can be removed by raising the hood and simply disconnecting the three spring latches 48 — one on the engine shroud adjacent the intake 103 and two on the carburetor box. Removal of the intake duct provides access to the fan, fan belt, and carburetor. The exhaust duct can be removed by removing the single spring latch secured thereto and pivoting the exhaust duct and the pulley guard 123 about the hinge connection to the frame provided by the bracket 124. This permits changing of the drive belt or inspection of the clutch.

In each embodiment ducts are rigid and self-supporting but are extremely light weight and readily removable. The ducting eliminates heat problems associated with enclosing the engine compartment and provides for a cleaner engine compartment. The carburetor air supply openings are located where snow and other impurities are at a minimum, thereby reducing the chance of carburetor icing and provides increased engine life. The ducts are formed of plastic which is a poor heat conductor and which isolates the carburetor from the engine to prevent vapor lock.

While in the foregoing specification, detailed descriptions of specific embodiments of the invention were set forth for the purpose of illustration, it is to be understood that many of the details herein given may be varied considerably by those skilled in the art without departing from the spirit and scope of the invention.

I claim:

1. A noise suppression duct assembly for a vehicle having an engine cowl and an air cooled engine comprising shroud means on the engine providing an air cooling chamber, the shroud means having an air intake opening and an air exhaust opening, the vehicle cowl having an air intake opening and an air exhaust opening, an air intake duct extending between the air intake opening of the cowl and the air intake opening of the shroud means and being removably secured to at least one of the cowl and the engine shroud means, and an air exhaust duct extending between the air exhaust opening of the engine shroud means and the air exhaust opening in the cowl and being removably secured to at least one of the engine shroud means and the cowl, each of the ducts providing a tortuous air passage therethrough whereby air cannot travel in a straight path from the air intake opening in the cowl to the air intake opening of the shroud means and from the air exhaust opening of the shroud means to the air exhaust opening in the cowl.

2. The structure of claim 1 in which each of the ducts is integrally molded from plastic and is light weight, and relatively rigid and self-supporting.

3. The structure of claim 1 in which each of the ducts includes flexible sealing means attached thereto and engaging the cowl around the associated opening therein to restrain leakage of noise between the cowl and the duct.

4. The structure of claim 1 including attachment means for each duct for removably securing each duct to at least one of the cowl and the engine shroud means, each attachment means including a resilient spring secured to one of the cowl and the engine shroud means and hook means secured to one of the ducts and being engaged by the spring.

5. The structure of claim 1 in which the cowl includes a hood extending rearwardly from the front end of the vehicle over the engine and a console closing the rear end of the cowl, the air intake and air exhaust opening in the cowl being provided through the console on opposite sides thereof and below the air intake and air exhaust openings, respectively, of the engine shroud means, the air intake duct extending forwardly and upwardly from the air intake opening in the console to the air intake opening of the engine shroud means, and the air exhaust duct extending downwardly and rearwardly from the air exhaust opening of the shroud means to the air exhaust opening in the console.

6. The structure of claim 5 including a carburetor mounted on the engine and extending rearwardly therefrom, the console including a rear wall and partition means positioned forwardly of the rear wall and having an opening therein, a carburetor box secured to the engine and extending rearwardly therefrom around the carburetor, and resilient seal means between the rear end of the carburetor box and the partition means and extending around the opening in the partition means, the carburetor box and the partition means and the rear wall of the console providing a carburetor plenum chamber, the console being provided with an air intake opening for the carburetor plenum chamber for supplying air to the carburetor plenum chamber and to the carburetor.

7. The structure of claim 6 in which the rear wall of the console includes a door portion for providing access to the carburetor through the plenum chamber.

8. The structure of claim 6 in which each of the ducts is formed of integrally molded plastic and is light weight, and relatively rigid and self-supporting.

9. The structure of claim 1 in which the cowl includes a hood extending rearwardly from the front end of the vehicle and over the engine, the air intake and air exhaust openings in the cowl being provided through the hood on opposite sides thereof.

10. The structure of claim 9 including a carburetor mounted on the engine, a carburetor box secured to the engine and extending around the carburetor, the air intake duct including an intake portion extending laterally inwardly from the intake opening in the hood, a first branch portion extending from the intake portion to the air inlet opening of the engine shroud means, and a second branch portion extending from the intake portion to the carburetor box, the second branch portion and the carburetor box having mating peripheries whereby a carburetor plenum chamber is formed by the second branch portion and the carburetor box, the first branch portion being removably secured to the engine shroud means and the second branch portion being removably secured to the carburetor box.

11. The structure of claim 10 in which each of the ducts is formed of integrally molded plastic and is light weight, and relatively rigid and self-supporting.

12. The structure of claim 10 in which each of the ducts is formed of integrally molded plastic and is relatively rigid and self-supporting, attachment means for each duct for removably securing each duct to the engine shroud means, each attaching means including a resilient spring secured to the engine shroud means and hook means secured to one of the ducts and being engaged by the spring.

* * * * *